Patented Aug. 24, 1937

2,091,236

UNITED STATES PATENT OFFICE 2,091,236

ANTHRAQUINONE VAT DYESTUFFS OF THE INDANTHRONE SERIES

Joseph Deinet, Milwaukee, Wis., assignor to E. I. du Pont de Nemours & Company, Wilmington, Del., a corporation of Delaware No Drawing. Application August 22, 1935, Serial No. 37,330

6 Claims. (Cl. 260—31)

This invention resides in the preparation of new anthraquinone vat dyestuffs of the indanthrone series and more particularly to the preparation of 3,3'-dihalogen-N-dimethyl-1,2,2',1'-anthraquinoneazines (3,3'-dihalogen-N-dimethyl-indanthrones).

It is known that 1-methylamino-2-bromo-anthraquinone can be condensed with a copper catalyst in the presence of an acid binding agent and a high boiling solvent to give N-dimethyl-indanthrone, which is a cold dyeing vat color. This product, like indanthrone itself, is not fast to bleach and therefore has little utility. It is also known that halogenated indanthrones are improved in their bleach fastness over the non-halogenated compounds, but in all cases they have limited solubility in the vat. The brominated indanthrones in general and the higher chlorinated indanthrones are quite unstable in the vat at normal vatting temperatures of 50–60° C. and are very sensitive to calcareous water. The instability of these compounds in the vat is believed to be due to their loss of halogen under the vatting conditions, for if vatting conditions are used under which the halogen is not removed from the indanthrone molecule, the products are relatively stable in the vat. At the vatting temperatures which must normally be used to dye the halogenated anthraquinone-hydroazines, halogen is liberated, even from the most stable, 3,3'-dichloro-indanthrone.

It is an object of the present invention to prepare indanthrone dyestuffs which are stable in, and may be dyed from, a cold hydrosulfite vat. It is a further object of this invention to provide an indanthrone dyestuff which is superior in bleach fastness to those heretofore prepared, and which may be dyed in ordinary hard water as well as distilled water.

I have found that a new cold dyeing indanthrone dyestuff which has good bleach fastness can be prepared by subjecting a 1,3-dihalogen-2-monomethylamino-anthraquinone to condensation under the conditions normally used for the preparation of indanthrones from 1-bromo-2-amino-anthraquinone or its halogenated derivatives. The resulting 3,3'-dihalogen-N-dimethyl-indanthrones can be isolated in high yields and in relatively pure form. These products have even better bleach fastness than the corresponding halogen containing dihydroazines and are relatively stable in the hydrosulfite vat from which they are dyed.

The following examples are given to more fully illustrate my invention. The parts used are by weight.

Example 1

100 parts of 1,3-dibromo-2-monomethylamino-anthraquinone are suspended in 600 parts of o-dichlorobenzene. 30 parts of dry sodium carbonate and 5 parts of copper acetate are added and the mass heated to 175–177° C. and held at this temperature for 6 hours. The mass is then cooled to 25°, filtered and washed with alcohol, then with hot water, and dried. The product thus obtained may be used directly for dyeing, although for best dyeing results the product is further purified by dissolving in 8 parts of concentrated sulfuric acid (96%), to which water is slowly added under agitation at 60–70° C. until the sulfuric acid is diluted to about 83%. The mass is then cooled, and the crystalline precipitate is filtered off. The filter cake is then washed free from impurities with about 4 parts of 78% sulfuric acid and then with water until acid free. When dried, the product is substantially pure dibromo-N-dimethyl-indanthrone, analyzing 24.93% bromine. It gives a yellow-brown color when dissolved in concentrated sulfuric acid. It gives a red-brown vat from which cotton is dyed by the cold dyeing method in the presence of salt in bright blue shades of good fastness to bleach.

Example 2

100 parts of 1-bromo-2-methylamino-3-chloro-anthraquinone are suspended in 600 parts of o-dichlorobenzene. 30 parts of sodium carbonate (dry) and 5 parts of copper acetate are added and the mass heated to 175–177° C. and held for 6 hours. It is then cooled, filtered, washed with alcohol and hot water and dried. The dry product may be purified in the manner described in Example 1. The purified product is substantially pure 3,3'-dichloro-N-dimethyl-indanthrone, analyzing 12.37% chlorine. It gives a yellow-brown color when dissolved in concentrated sulfuric acid, and gives a red-brown vat with sodium hydrosulfite and caustic soda from which cotton may be dyed by the cold dyeing method in bright blue shades (red cast) of very good bleach fastness.

Example 3

100 parts of 1,3-dichloro-2-monomethylamino-anthraquinone are suspended in 600 parts of o-dichlorobenzene. 30 parts of dry sodium carbonate and 5 parts of copper acetate are added under agitation and the mass is heated to 175–177° C. and held at this temperature for 5–6 hours. It is then cooled to 25°, filtered, washed with o-dichlorobenzene, alcohol and water in turns, and dried. The product is purified by the procedure outlined in Example 1. The product is identical with that obtained by Example 2.

*Example 4*

100 parts of 1,3-dibromo-2-monomethylamino-anthraquinone are suspended in 600 parts of nitrobenzene. 50 parts of postassium acetate and 2 parts of copper powder are added under agitation and the mass heated to 175–180° C. and maintained at that temperature for 6 hours. The charge is cooled to 25° C., filtered, washed with nitrobenzene, alcohol and hot water in turns, and dried. The product may be purified by the procedure outlined in Example 1, and is identical with the product of Example 1.

*Example 5*

600 parts of naphthalene are heated to 100° C. and under agitation 100 parts of 1,3-dibromo-2-monomethylamino-anthraquinone, 30 parts of dry sodium carbonate and 5 parts of copper acetate are added, and the mass is heated to 175–180° C. and maintained at that temperature for 6 hours. It is then cooled to 130° C. and 1200 parts of solvent naphtha are added. The mass is then filtered at 40°, washed with solvent naphtha, then with alcohol and hot water in turns, and dried. The crude product may be purified according to the process above outlined. The resulting product is identical with that obtained by Example 1.

The 1,3-dibromo-2-monomethylamino-anthraquinone compounds used in Example 1 may be prepared by dissolving 100 parts of the 1,3-dibromo-2-amino-anthraquinone in 1000 parts of oleum (14% free $SO_3$) at a temperature of from 10–15° C. When the solution is complete, 100 parts of formaldehyde solution (37%) are added over a period of 3–4 hours, and the temperature raised to 25° C. and held while the mass is agitated for about 24 hours. The mass is then poured into 7500 parts of water, heated to 95–100° C. and held for ½–1 hour. It is then filtered, the filter cake washed acid free and dried.

The 1-bromo-2-monomethylamino-3-chloro-anthraquinone and the 1,3-dichloro-2-monomethylamino-anthraquinone used in Examples 2 and 3 may be prepared by the same procedure, starting with the corresponding 1-bromo-2-amino-3-chloro-anthraquinone or the 1,3-dichloro-2-amino-anthraquinone as more fully described in my copending application Ser. No. 37,329, filed of even date herewith.

As illustrated by the examples above given, the condensation may be carried out in the presence of inert high-boiling organic solvents, such as o-dichlorobenzene, nitrobenzene and naphthalene, in the presence of an acid binding agent such as sodium carbonate, sodium or potassium acetate, etc., and copper powder or a copper salt as the catalyst. In all cases the resulting dimethyl-dihalogen-indanthrone gives a red-brown vat from which cotton is dyed by the cold dyeing method in bright blue shades of good bleach fastness.

I claim:

1. 3,3'-dihalogen-N-dimethyl-1,2,2',1'-anthraquinoneazine.

2. 3,3'-dichloro-N-dimethyl-1,2,2',1'-anthraquinoneazine.

3. 3,3'-dibromo-N-dimethyl-1,2,2',1'-anthraquinoneazine.

4. The process which comprises condensing a 1,3-dihalogen-2-monomethylamino-anthraquinone to the corresponding dihalogen-dimethyl-indanthrone compound by heating the same in an inert high boiling solvent in the presence of an acid binding agent and a copper catalyst.

5. The process which comprises condensing a 1,3-dichloro-2-monomethylamino-anthraquinone to the corresponding dichloro-dimethyl-indanthrone compound by heating the same in an inert high boiling solvent in the presence of an acid binding agent and a copper catalyst.

6. The process which comprises condensing a 1,3-dibromo-2-monomethylamino-anthraquinone to the corresponding dibromo-dimethyl-indanthrone compound by heating the same in an inert high boiling solvent in the presence of an acid binding agent and a copper catalyst.

JOSEPH DEINET.